United States Patent [19]

Stark

[11] 3,902,444
[45] Sept. 2, 1975

[54] HEIGHT CONTROL SYSTEM FOR HYDROFOIL CRAFT

[75] Inventor: Donald R. Stark, Seattle, Wash.

[73] Assignee: The Boeing Company, Seattle, Wash.

[22] Filed: Oct. 10, 1973

[21] Appl. No.: 404,878

[52] U.S. Cl. .................................. 114/66.5 H
[51] Int. Cl. ................................... B63b 1/22
[58] Field of Search ...................... 114/66.5 H

[56] References Cited
UNITED STATES PATENTS

| | | | |
|---|---|---|---|
| 3,137,260 | 6/1964 | Harris, Jr. et al. | 114/66.5 H |
| 3,149,601 | 9/1964 | Lang | 114/66.5 H |
| 3,175,526 | 3/1965 | Johnson, Jr. et al. | 114/66.5 H |
| 3,469,550 | 9/1969 | Priestley | 114/66.5 H |

Primary Examiner—Duane A. Reger
Assistant Examiner—Stuart M. Goldstein
Attorney, Agent, or Firm—Brown, Murray, Flick & Peckham

[57] ABSTRACT

A control system is provided for hydrofoil craft in which the height of the craft above the water is controlled in response to signals derived from a height sensor and from a vertical accelerometer on the craft. These two signals are passed separately through integrating networks and then combined to obtain a control signal which contains a component directly proportional to the height of the craft above the mean water level and a component representative of the height of the actual water surface relative to the mean water level but modified as desired for obtaining a smoother ride, or for other purposes.

3 Claims, 3 Drawing Figures

HEIGHT CONTROL SYSTEM FOR HYDROFOIL CRAFT

BACKGROUND OF THE INVENTION

The present invention relates to the control of hydrofoil craft in the foil-borne mode of operation, and more particularly to control of the height of the craft above the water surface.

Hydrofoil craft have foils which are attached to the hull by struts and which move through the water below the surface when the craft is operated in the foil-borne mode. The foils develop lift in much the same manner as an aircraft wing and when a sufficiently high speed is attained, they support the hull of the craft above the surface of the water. The craft is controlled by control surfaces pivotally mounted on the foils, or the foils themselves may be pivotally mounted on the struts to function as control surfaces. The control surfaces are actuated and positioned in response to signals derived from suitable sensors and other control devices, and function to maintain the attitude and direction of the craft and its height above the water, and to control and stabilize roll, pitch and yaw of the craft. A control system of this type is shown, for example, in a copending application of D. R. Stark et al., Ser. No. 302,559, filed Oct. 31, 1972 and assigned to the Assignee of the present invention, although it will be apparent that the system of the present invention is not necessarily limited in its application to this particular type of control system.

The height of the hydrofoil above the water is maintained by positioning one or more of the control surfaces in the proper angular position to maintain the desired height. This may be done in response to a signal from a height sensor on the craft which provides a signal proportional to the instantaneous height above the water surface. This height signal is combined with a height command signal which sets the desired height, to obtain an error signal for adjusting or changing the position of the control surface as required. The water surface, however, is constantly changing its configuration and vertical position due to wave motion and other forces, and if a simple control such as just described were used alone, the craft would attempt to exactly follow the rise and fall of the water surface, resulting in a very rough ride.

While several approaches are available for ride smoothing, one of the more direct methods is to provide some means for filtering or shaping the height control signal so as to minimize the undesirable wave motion in the height signal without adversely affecting the required height control of the craft. A height measurement such as that referred to above, which indicates the instantaneous height of the craft above the water surface, necessarily includes a measurement of the height of the craft above the mean water level plus a measurement of the wave height relative to the mean water level. In the past, it has been attempted to obtain a smoother ride by filtering the height signal to remove the wave height component leaving only the height measurement above the mean water level. Such attempts, however, have resulted in dynamic stability problems and have caused broaching of the foils and contact of the wave crests with the hull in rough water.

SUMMARY OF THE INVENTION

In accordance with the present invention, a height control signal for hydrofoil craft is obtained in a manner which permits shaping or filtering the wave height information contained in the signal to any desired extent while preserving the height measurement above the mean water level unfiltered for effective control of the height of the craft.

This result is accomplished by utilizing a height sensor and a vertical accelerometer mounted at substantially the same location on the craft. The height signal obtained from the height sensor and the vertical acceleration signal obtained from the accelerometer are separately passed through integrating networks which provide outputs proportional to approximate double integrals of the respective input signals. The outputs of these integrating networks are combined in a summing network to give a final output signal which can be shown to contain a component proportional to the height of the craft above the mean water level and a component representative of the wave height relative to the mean water level but modified as determined by the constants of the networks to provide any desired degree of filtering or shaping of the wave height component. This final output signal can then be used as a control signal in any desired type of hydrofoil control system and may, for example, be combined with a height command signal to provide an error signal for positioning a control surface. In this way, an unfiltered height signal is provided for controlling the height of the craft above the mean water level while the wave height portion of the signal is filtered or shaped as desired for ride smoothing, or other purposes, without affecting the mean height signal. Very effective ride smoothing is thus obtained without affecting the height holding or stability characteristics.

BRIEF DESCRIPTION OF THE DRAWINGS

The invention will be more fully understood from the following detailed description, taken in connection with the accompanying drawing, in which.

DESCRIPTION OF THE PREFERRED EMBODIMENT

Figure 1:
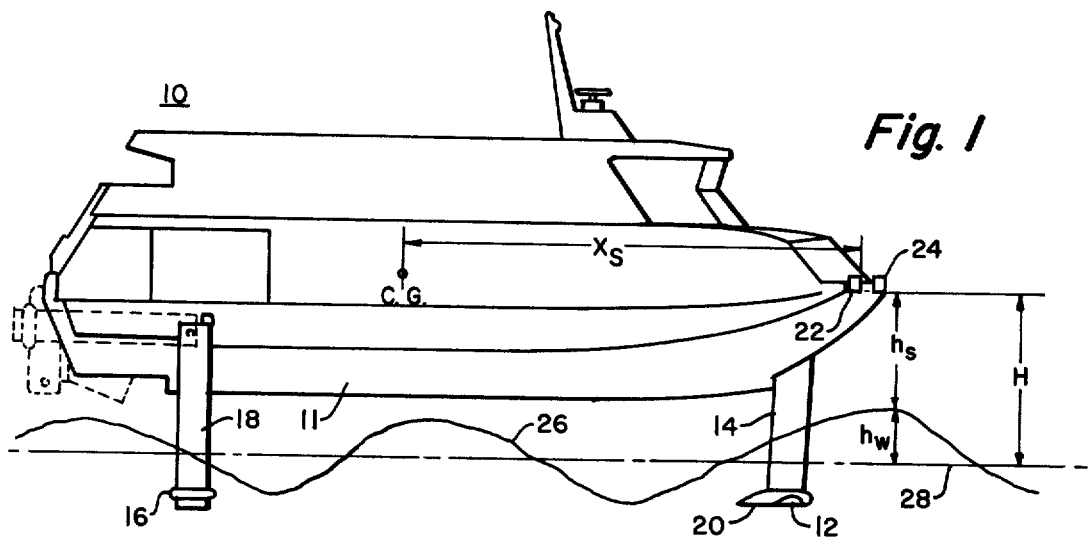
FIG. 1 is a schematic diagram illustrating a typical hydrofoil craft and its relation to the water.

There is shown in FIG. 1 a diagrammatic representation of a hydrofoil craft 10 having a hull 11 of any desired construction. A forward foil 12 is attached to the hull 11 by a forward strut 14 and an aft foil or foils 16 are attached to the hull by struts 18. Any desired type of propulsion system may be utilized and the hydrofoil 10 may be of any desired construction which has not been illustrated in detail as the particular structure and propulsion means of the craft 10 are not a part of the present invention. A control surface or flap 20 is shown pivotally mounted on the forward foil 12 to determine the height at which the foils support the hull 11 above the water. The altitude or height of the craft is determined and maintained by the angular position of the control surface 20 and may be adjusted or changed by suitably changing the position of the control surface. It will be understood that similar control surfaces are also provided on the aft foil 16 and that, if desired, the aft control surfaces might be used instead of, or together with, the forward control surface 20 to control the height of the craft 10. The control signal derived in the manner described hereinafter may be used to control the position of any of these control surfaces as required.

A height sensor 22 is mounted at a suitable location on the craft 10, preferably at the bow as shown. The sensor 22 may be of the radar, sonar or other type to provide a signal proportional to the height of the sensor above the surface of the water. A vertical linear accelerometer 24 is mounted closely adjacent the sensor 22 so as to be in substantially the same longitudinal location on the ship as the height sensor. If necessary or desired, however, the accelerometer 24 could be mounted elsewhere on the ship and its signal corrected by a pitch angle measurement using common pitch correction computations. In either case, the accelerometer provides a signal proportional to the vertical acceleration of the craft at the point where the height sensor is mounted. The center of gravity of the craft is indicated at CG and the distance from the center of gravity to the position of the height sensor 22 and accelerometer 24 is designated as $X_s$.

The position of the hydrofoil 10 with respect to the water is also shown in FIG. 1. The water surface is indicated by the solid line 26 with waves of substantial height. It will be understood, of course, that the position of the water surface is constantly changing, so that the line 26 represents only the instantaneous position at one particular instant. The mean water level is indicated by the dot-dash line 28 and provides a relatively stable reference plane although it will be understood that the vertical position of the mean water level will vary somewhat as the wave motion changes. The mean water level 28 can thus be used as an inertial reference and the height of the height sensor 22 above the mean water level, designated $H$ in FIG. 1, may be considered the inertial height of the craft. The height sensor 22 provides a signal proportional to the instantaneous height of the sensor above the surface of the water, designated $h_s$ in FIG. 1. The wave height, that is, the height or position of the surface of the water relative to the mean water level is designated $h_w$ in FIG. 1. The following relation is apparent from inspection of FIG. 1:

$$H = h_s + h_w$$

Figure 2:
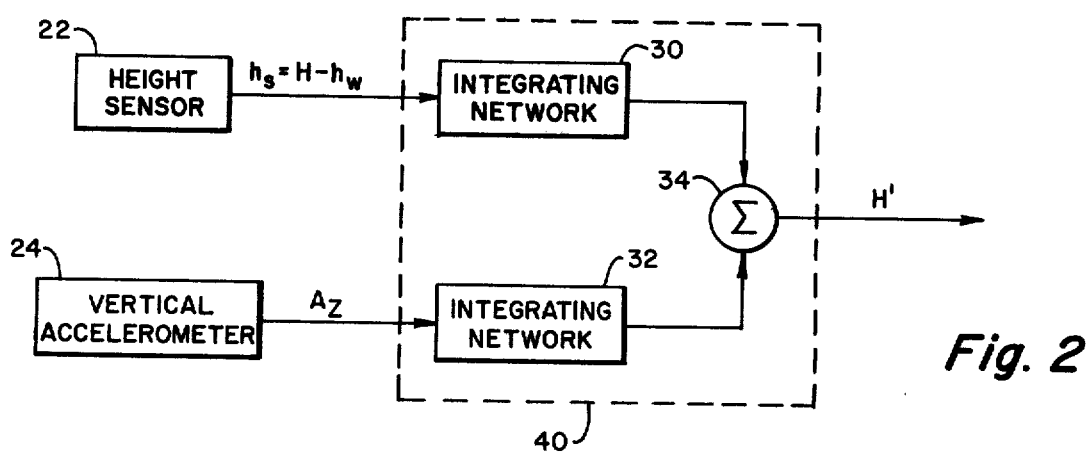
FIG. 2 is a block diagram illustrating the manner of obtaining a height control signal.

In accordance with the present invention, the signals from the height sensor 22 and vertical accelerometer 24 are utilized to provide a final control signal for controlling the position of the control surface 20. As shown in FIG. 2, the signal $h_s$ from the height sensor 22 is passed through an integrating network 30. The signal from the vertical accelerometer 24 representing the vertical acceleration $A_z$ of the craft is separately passed through another integrating network 32 and the output signals of the two networks are combined in a summing network 34 to give a final output signal $H'$. The integrating networks 30 and 32 may be conventional integrating networks such as are commonly used in analog and digital computer circuits, and are designed with the transfer functions given below to provide the approximate double integrals of the signals fed into them. The term "approximate double integral" is utilized to indicate that the networks 30 and 32 provide outputs proportional to the double integral of the respective input signals at frequencies above a definite minimum frequency below which the input signal is not integrated. This type of network is, of course, well known and is utilized to avoid the necessity of using unduly complicated circuitry to include frequencies below the frequency range of interest. The summing network 34 may be any conventional network which adds together the two signals fed into it to provide the final output signal $H'$ which contains two components having the desired characteristics as will now be more fully discussed.

As previously indicated, the height signal obtained from the sensor 22 may be considered as representing the inertial height above the mean water level combined with the wave height, and is also modified by the vertical motion of the craft. Similarly, the vertical acceleration signal may be regarded as representing the vertical acceleration of the craft as modified by vertical components of the forward movement of the craft. The following equations can therefore be written for the inertial height $H$ and the vertical acceleration $A_z$ in terms of observable quantities:

$$H = h_o + \int (W - \mu_o \theta) \, dt - X_s \theta \qquad (1)$$

$$A_z = \frac{dW}{dt} - \frac{d(\mu_o \theta)}{dt} - X_s \frac{d^2\theta}{dt^2} \qquad (2)$$

where:

$h_o$ = height above water surface, $W$ = vertical velocity of craft along the craft's vertical axis, $\mu_o$ = forward velocity of the craft along the craft's longitudinal axis, $\theta$ = pitch angle about the center of gravity, = sin $\theta$ for small angles.

The transfer function $T_1$ of the integrating network 30 is as follows, using Laplace notation, $\delta$ being the damping factor of the network and $\omega_n$ being the natural frequency:

$$T_1 = \frac{\dfrac{2\delta S}{\omega_n} + 1}{\dfrac{S^2}{\omega_n^2} + \dfrac{2\delta S}{\omega_n} + 1}$$

Similarly, the transfer function $T_2$ of the integrating network 32 is:

$$T_2 = \frac{\dfrac{1}{\omega_n^2}}{\dfrac{S^2}{\omega_n^2} + \dfrac{2\delta S}{\omega_n} + 1}$$

As previously described, the height signal and acceleration signal from the sensor 22 and accelerometer 24 are applied to the networks 30 and 32, respectively, and the outputs of the networks are summed. The resulting output signal is:

$$H' = \left[ (H - h_w) \left( \frac{2\delta S + \omega_n}{\omega_n} \right) + A_z \frac{1}{\omega_n} \right] \left[ \frac{\omega_n^2}{S^2 + 2\delta S \omega_n + \omega_n^2} \right] \qquad (3)$$

Equations (1) and (2) may be rewritten in Laplace notation as follows:

$$H = \frac{W}{S} - \mu_o \frac{\theta}{S} - X_s\theta + h_o$$

$$A_z = WS - \mu_o\theta S - X_s\theta S^2$$

Therefore:

$$A_z = HS^2 \tag{4}$$

Substituting Equation (4) into Equation (3):

$$H' = H - h_w \omega_n \frac{2\delta S + \omega_n}{S^2 + 2\delta S\omega_n + \omega_n^2} \tag{5}$$

Equation (5) shows that a final output signal $H'$ is obtained consisting of two components. The first component is proportional to the unmodified inertial height $H$ of the height sensor above the mean water level, and the second component represents the instantaneous wave height $h_w$ relative to the mean water level modified by the dynamic operator or filter $$\frac{\omega_n(2\delta S + \omega_n)}{S^2 + 2\delta S\omega_n + \omega_n^2}$$

The natural frequency $\omega_n$ and damping factor $\delta$ of the integrating networks can, of course, be varied as necessary in the design of the networks to obtain any desired degree of filtering or shaping of the wave height component of the signal.

Figure 3:
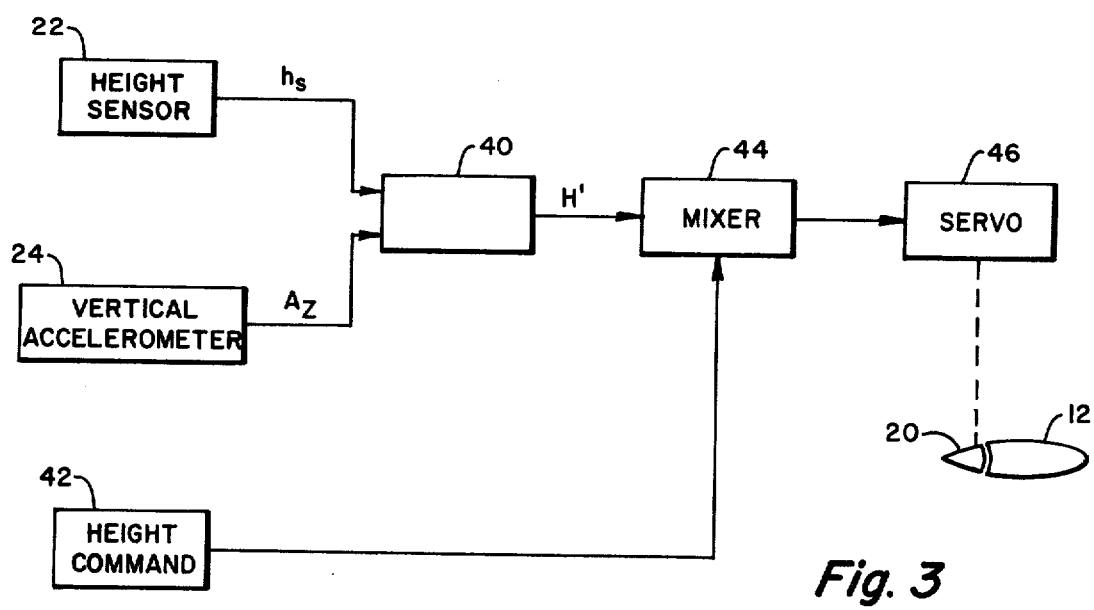
FIG. 3 is a simplified block diagram illustrating a typical height control system.

The final output signal $H'$ may be used as a control signal in any desired type of control system. As shown in FIG. 3, for example, the final control signal $H'$ obtained from the integrating and summing networks, generally designated 40, may be combined in a mixer 44 with a height command signal 42, set by the pilot or otherwise, to provide an error signal. The error signal is applied to a servo mechanism 46 to control the position of a control surface, such as the flap 20 of FIG. 1, to maintain the desired height of the craft. It will be understood that the simplified system of FIG. 3 is intended to be representative of any suitable control system, such as that disclosed in the copending application mentioned above or any other desired type of system.

It should now be apparent that a system has been provided for developing a control signal for use in controlling the height of a hydrofoil craft above the water and which has the desired characteristics. That is, the control signal includes an unfiltered component directly proportional to the height of the craft above the mean water level so that the height holding function of the control can readily be performed without any serious stability problems. The control signal, however, also contains a component representing the wave height, or the position of the water surface relative to the mean water level, which is filtered or shaped to the desired degree to modify the control to obtain a desirably smooth ride, or for other purposes. Thus, the present invention makes it possible to obtain the desired degree of ride smoothing in a hydrofoil craft without affecting stability and without the problems that were previously involved.

I claim as my invention:

1. In a control system for a hydrofoil craft having a control surface for maintaining the craft at a desired height above the water, means for generating signals for controlling the position of said control surface, said signal generating means including means for providing a first signal representative of the height of the craft above the surface of the water, means for providing a second signal representative of the vertical acceleration of the craft, a first integrating network for said first signal, a second integrating network for said second signal, said networks producing signals proportional to approximate double integrals of said first and second signals, respectively, and means for combining the signals produced by said networks to obtain an output signal having a component proportional to the height of the craft above the mean water level and a component representative of the instantaneous height of the water surface relative to the mean water level, said last-mentioned component being modified in a predetermined manner.

2. The combination defined in claim 1 and including a height sensor for providing said first signal and a vertical accelerometer for providing said second signal, said height sensor and said accelerometer being mounted on the craft in closely adjacent positions.

3. The combination defined in claim 2 including means for combining said output signal with a height command signal to develop an error signal for controlling the position of said control surface.

* * * * *